(12) United States Patent
Linder et al.

(10) Patent No.: US 9,886,857 B2
(45) Date of Patent: Feb. 6, 2018

(54) ORGANIZED INTELLIGENT MERGING

(71) Applicant: HERE Global B.V., Veldhoven (NL)

(72) Inventors: Eric Linder, Downers Grove, IL (US); Andrew Ryu, Hinsdale, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/855,871

(22) Filed: Sep. 16, 2015

(65) Prior Publication Data
US 2017/0076607 A1    Mar. 16, 2017

(51) Int. Cl.
| G05D 1/00 | (2006.01) |
| G05D 1/02 | (2006.01) |
| G08G 1/16 | (2006.01) |
| B60W 30/095 | (2012.01) |
| B60W 40/04 | (2006.01) |
| B60Q 1/34 | (2006.01) |

(52) U.S. Cl.
CPC .......... *G08G 1/167* (2013.01); *B60Q 1/346* (2013.01); *B60W 30/0956* (2013.01); *B60W 40/04* (2013.01); *G05D 1/0289* (2013.01); *G08G 1/166* (2013.01); *G05D 2201/0213* (2013.01)

(58) Field of Classification Search
CPC .......... G05D 1/0088; G05D 1/00289; G05D 2201/0213; G08G 1/167; G08G 1/66
USPC .......................................................... 701/23
See application file for complete search history.

(56) References Cited

U.S. PATENT DOCUMENTS

| 3,734,433 A * | 5/1973 | Metzner .................. B60K 1/00 104/88.02 |
| 6,150,932 A | 11/2000 | Kenue |
| 8,209,075 B2 | 6/2012 | Senneff |
| 8,818,572 B1 * | 8/2014 | Tofte ..................... B64C 39/024 244/75.1 |
| 2010/0100268 A1 * | 4/2010 | Zhang ................... B60W 30/09 701/25 |
| 2013/0099911 A1 * | 4/2013 | Mudalige ............... G08G 1/163 340/438 |
| 2013/0138331 A1 | 5/2013 | Lynar et al. |
| 2013/0242284 A1 * | 9/2013 | Zeng ....................... G01S 17/66 356/4.01 |

FOREIGN PATENT DOCUMENTS

EP    2343502    7/2011

OTHER PUBLICATIONS

Feng et al., PSO-Based DBSCAN with Obstacle Constraints, Dec. 15, 2012, Harbin Engineering University.
Kamble et al., Self Adaptive Broadcasting Algorithm for VANET Using Bio Inspired Computing, Mar. 2014, G.H. Raisoni College of Engineering.

* cited by examiner

*Primary Examiner* — Yazan Soofi
(74) *Attorney, Agent, or Firm* — Lempia Summerfield Katz LLC

(57) ABSTRACT

A method is provided for organized intelligent merge notifications. The method includes identifying a merge aperture using a processor. Merging vehicle parameters for a merging vehicle approaching the merge aperture are received over a network. Simulations of traffic moving through the merge aperture is performed by the processor based on the received merging vehicle parameters. The simulations are optimized by the processor to determine a merge distance for the merging vehicle. A merge notification is generated by the processor for the merging vehicle based on the merge distance.

26 Claims, 9 Drawing Sheets

| Notification Distance (m) | Average Speed (km/h) | Throughput Time (s) |
|---|---|---|
| None | 25.6249868144 | 52 |
| 1500 | 49.2895083566 | 32 |
| 2390.20883951 | 50.9445958312 | 27 |
| 3000 | 52.1427065461 | 28 |

Table 1

Table 2

ORGANIZED INTELLIGENT MERGING

FIELD

The following disclosure relates to performing a traffic simulation, and more particularly to optimizing the traffic simulation to determine a merge point.

BACKGROUND

Map data and other geographic data are used by computer based systems to provide useful features to users. For example, computer based systems may identify routes to destinations or other points of interests. A navigation system may determine the optimum route to be taken by the end user to travel from an origin to a destination location from map data stored in a map database. Similarly, the navigation system may query the map data for nearby points of interest, or provide other map-related functions.

At a merge aperture, such as near on-ramps and construction zones, physical signs are often placed ahead of the merge aperture notifying drivers to merge in advance of the merge aperture. Navigation systems display upcoming merge apertures to the driver and rely on engineering experience, average vehicle stopping distances and physical road characteristics to provide driver instructions. These navigation systems do not provide optimum traffic flow because the systems do not take into account additional information, such as current road conditions, current weather and individual vehicle characteristics.

SUMMARY

In one embodiment, a method is provided for organized intelligent merge notifications. The method includes identifying a merge aperture using a processor. Merging vehicle parameters for a merging vehicle approaching the merge aperture are received over a network. Simulations of traffic moving through the merge aperture is performed by the processor based on the received merging vehicle parameters. The simulations are optimized by the processor to determine a merge distance for the merging vehicle. A merge notification is generated by the processor for the merging vehicle based on the merge distance.

In another embodiment, an apparatus is provided for organized intelligent merge notifications. The apparatus includes at least one processor and at least one memory including computer program code for one or more programs. The memory and the computer program code are configured to cause the apparatus to identify an upcoming merge aperture with the processor. The memory and the computer program code are further configured to calculate a merging vehicle parameter for a vehicle approaching the merge aperture and to receive environmental parameters for the merge aperture over a network. The processor performs simulations of traffic moving through the merge aperture based on the merging vehicle parameters and the received environmental parameters. The processor optimizes the simulations to determine a merge distance for the merging vehicle and generates a merge notification for the merging vehicle based on the merge distance.

In another embodiment, a computing device is provided, operable to identify a merge aperture, to calculate merging vehicle parameters for a vehicle approaching the merge aperture, to calculate environmental parameters for the merge aperture and to simulate traffic moving through the merge aperture based on the merging vehicle parameters and the received environmental parameters. The computing device if further operable to optimize the simulation to determine a merge distance for the merging vehicle and to initiate merging of the merging vehicle based on the merge distance.

BRIEF DESCRIPTION OF THE DRAWINGS

Exemplary embodiments of the present invention are described herein with reference to the following drawings.

DETAILED DESCRIPTION

The following embodiments describe systems and methods for determining a merge point and providing a merge point notification for a merging vehicle ahead of a merge aperture to achieve the highest traffic flow (e.g., the highest average speed of all vehicles). Vehicle navigation and driver assistance systems may notify drivers of upcoming merge apertures. A traffic simulation is performed, and may take into account the merging vehicle's current characteristics, other vehicles' current characteristics and the current road and weather conditions in addition to relying on engineering experience, average vehicle stopping distances and physical road characteristics to determine when to notify a driver to merge. The traffic simulation is optimized to determine a merge distance and a merge notification distance for the merging vehicle. A merge notification, such as a warning or a driving instruction, is provided to a driver, a navigation system and/or an autonomous driving system in the merging vehicle.

The embodiments may allow for faster merge times for the merging vehicle and higher throughput of all vehicles through the merge aperture. For example, without a merge notification, a driver or autonomous driving system may continue to naively drive in a merging lane of traffic until the vehicle is in close proximity to the merge aperture. When the vehicle arrives at the merge aperture, the vehicle may not be able to merge from the merging lane because other vehicles are traveling in the through-lane blocking the vehicle from merging. The inability of the vehicle to merge may cause the vehicle to have to stop resulting in traffic jam near the merge aperture. Providing a merge notification to the vehicle may prevent traffic jams and increase the average speed of all vehicles traveling through the merge aperture.

Figure 1:
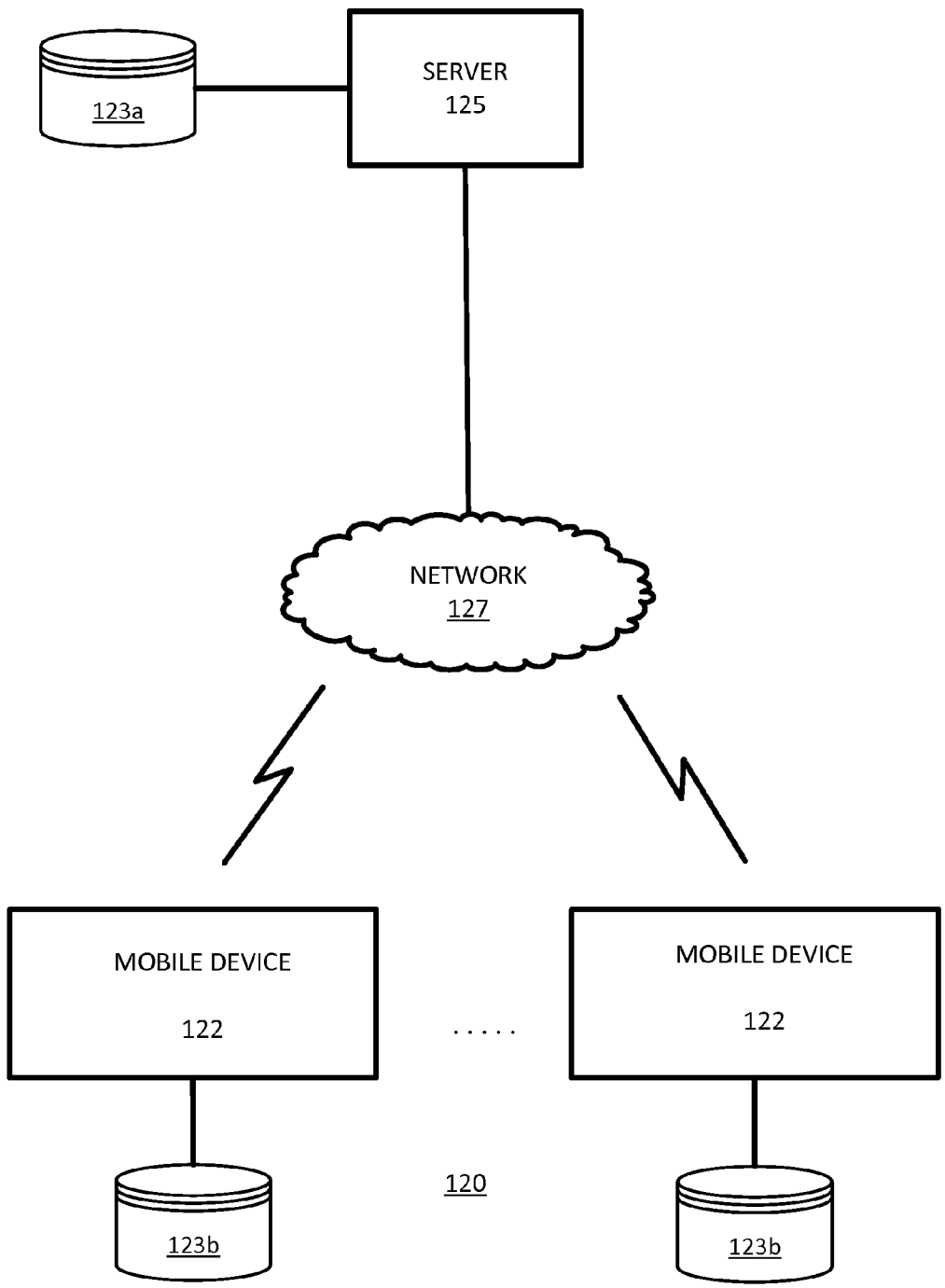
FIG. 1 illustrates an example map developer system according to an embodiment.

FIG. 1 illustrates an example of a system 120 for determining a merge point and providing a merge point notification according to an embodiment. The system 120 includes mobile devices 122 (e.g., navigation devices and/or assisted driving systems), a server 125 (e.g., a "cloud" server and/or a map developer system) and a network 127 (e.g., a cellular network). The databases 123*a* and 123*b* may be geographic databases including road links or segments. Additional, different, or fewer components of system 120 may be provided. For example, many varieties of mobile devices 122 may connect with the network 127, including mobile telephones, navigation systems, personal computers, assisted driving vehicles, etc. Assisted driving vehicles include autonomous vehicles, highly assisted driving (HAD) and advanced driving assistance systems (ADAS). An assisted driving device 122 may be included in the vehicle.

Figure 2:
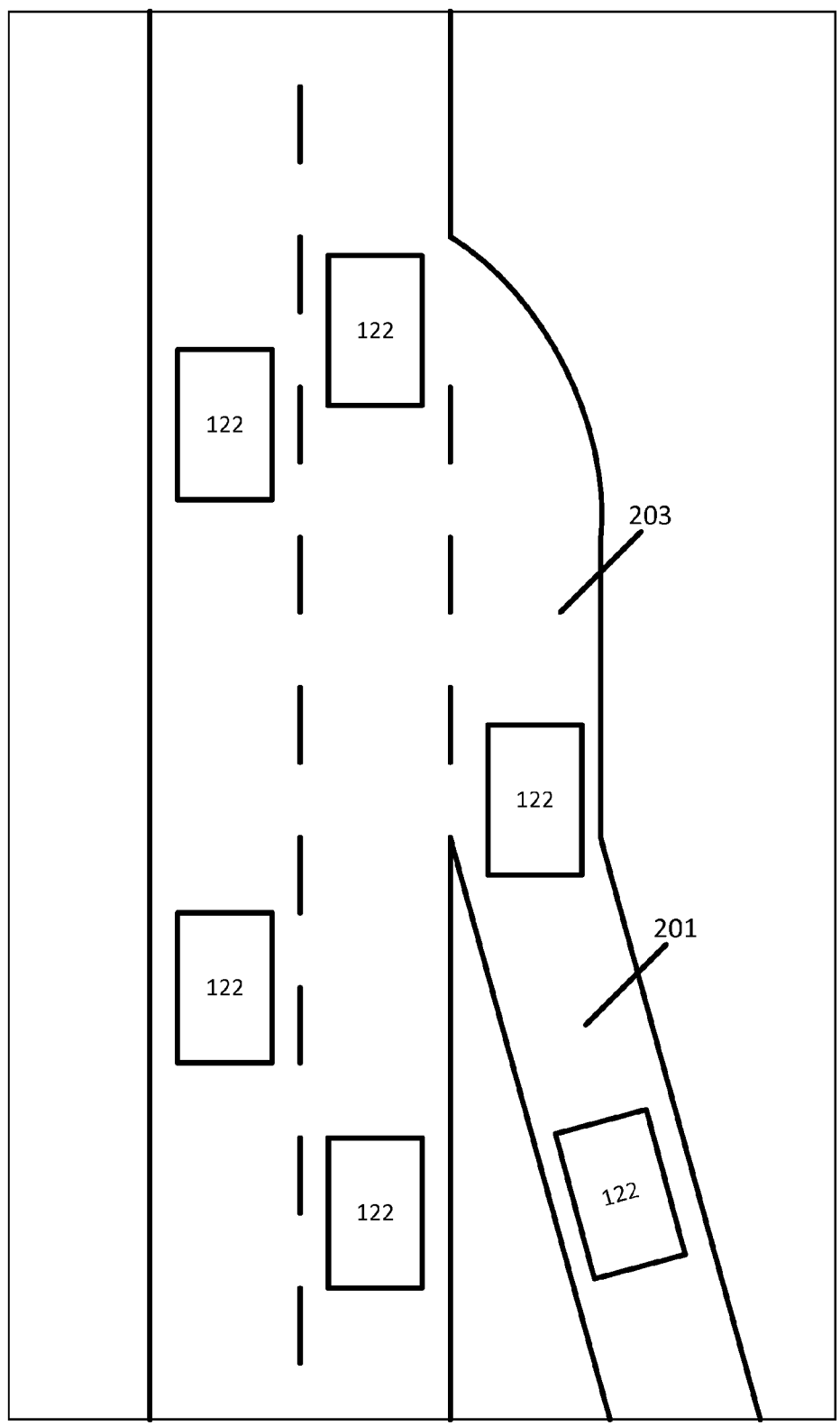
FIG. 2 illustrates an example of a merge aperture.
Figure 3:
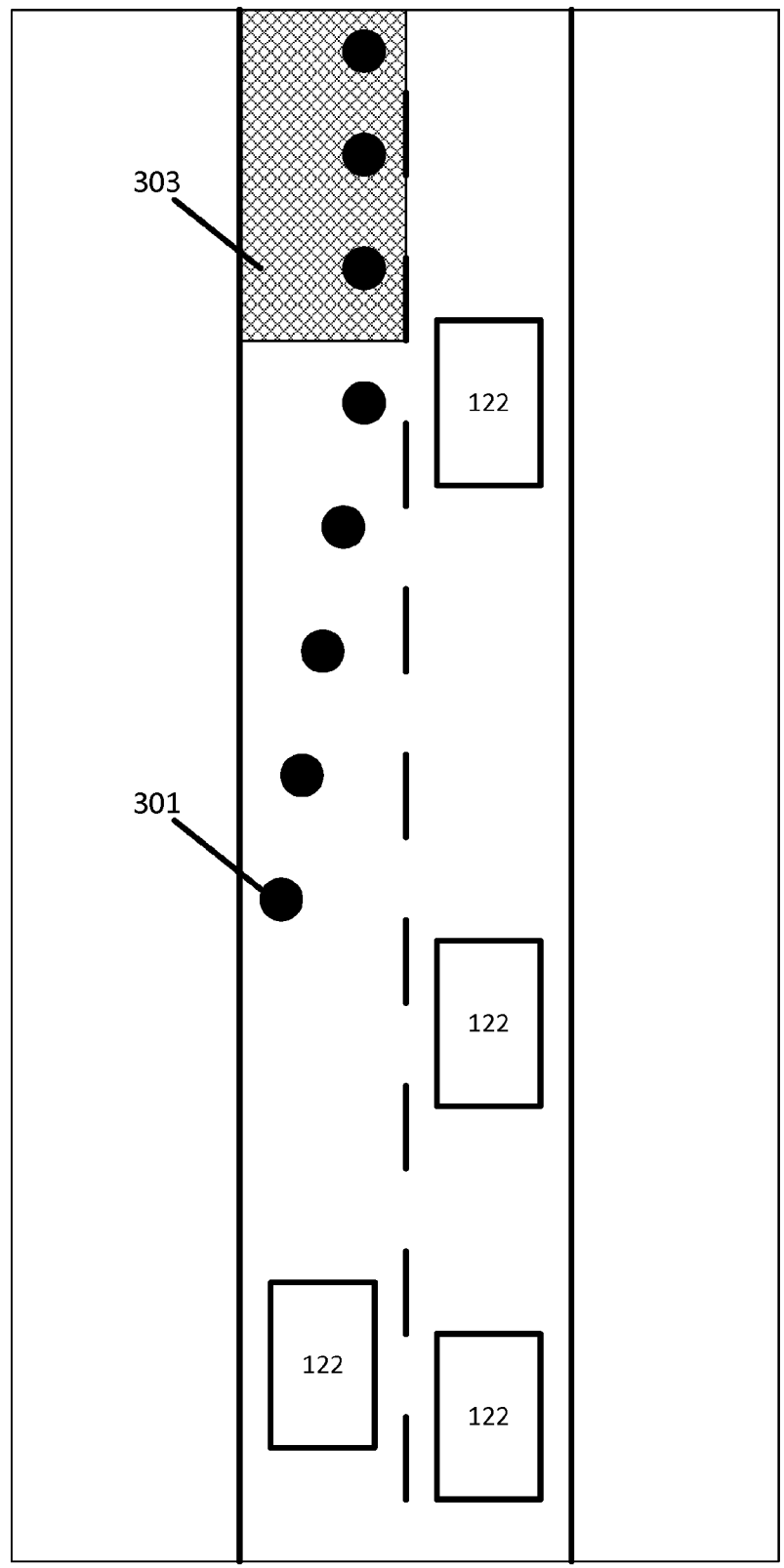
FIG. 3 illustrates another example of a merge aperture.

In an embodiment, the server 125 or a mobile device 122 identifies a merge aperture from the geographic databases 123*a* and 123*b*, respectively. For example, FIG. 2 illustrates an example of a merge aperture. FIG. 2 depicts a highway on-ramp 201 and merging lane 203. Alternatively, the server 125 or mobile device 122 detects and identifies a merge aperture from traffic patterns (e.g., patterns associated vehicular accidents, construction zones, etc.). For example FIG. 3 illustrates an example of a detected merge aperture. FIG. 3 depicts a construction zone 303 delineated by traffic cones 301. The server 125 or mobile device 122 receives traffic data from the mobile devices 122 and identifies the merge aperture based traffic patterns in the received data. In another embodiment, a mobile device 122 detects and identifies a merge aperture, and transmits the location and characteristics of the merge aperture to the server 125 and/or the other mobile devices 122 over the network 127. In yet another example, a user identifies a merge aperture and provides an input to a mobile device 122. The user input is transmitted to the server 125 and/or the other mobile devices 122 to over the network 127. The location and characteristics of the merge aperture may be used to update the geographic databases 123*a* and 123*b*.

The mobile devices 122 collect vehicle data (e.g., vehicle parameters) and environmental data (e.g., environmental parameters) for each vehicle with a mobile device 122. The vehicle and environmental data is stored on a server 125 in the "cloud." In each vehicle equipped with a mobile device 122, the mobile device 122 collects vehicle data for the vehicle, such as the current speed of the vehicle, the current geographic position of the vehicle, the vehicle type and characteristics, the merging agility of the vehicle, etc. The mobile device 122 collections environmental data for each vehicle, including the current road conditions, current weather conditions and/or current characteristics of other vehicles in the vicinity of the vehicle. The mobile devices 122 transmit the data collected to the server 125 and/or other mobile devices 122 over the network 127. Additional, fewer or different data may be collected and transmitted for each vehicle.

The server 125 or mobile device 122 uses the vehicle data from vehicles in the vicinity of the merge aperture to simulate traffic moving through the merge aperture. Alternatively, the server 125 and mobile device(s) 122 collectively simulate traffic moving through the merge aperture using the vehicle data. Vehicles are in the vicinity of the merge aperture if the vehicles are approaching the merge aperture, are traveling through the merge aperture (i.e., adjacent to the merge aperture) or are departing from the merge aperture. For example, vehicle data from vehicles within a predefined threshold distance of the merge aperture are used (e.g., vehicles approaching, adjacent to or departing from the merge aperture, within the threshold distance of the merge aperture). Examples for the threshold distance may include 100 meters, ¼ mile, 500 meters, ½ mile, 1 kilometer, or 1 mile.

The traffic simulation is an event driven traffic simulation using the vehicle and environmental data collected from the mobile devices 122 (e.g., real data from the real vehicles traveling the road). For example, a simulation may include the following parameters: the total number of vehicles; each vehicle's speed; a maximum and minimum speed of each vehicle; and the current position of each vehicle. Additional, different or fewer parameters may be used. The simulation may implement an obstacle avoidance schema (e.g., preventing vehicles from colliding while driving and merging) and a traffic schema (e.g., simulating random vehicle speed increases and decreases, lane changes, traffic lights, turns, etc.) to simulate traffic through the merge aperture. Further, the simulation may take into account current road characteristics, such as: lane dividers; the edge of the road; curves; and elevation changes. The simulation yields an average speed and time for all vehicles traveling through the merge aperture based on a merge distance of a merging vehicle and/or a notification distance for the merging vehicle.

The server 125 or mobile device 122 optimizes the traffic simulation. For example, the simulation is optimized iteratively, by modifying and re-performing the simulation based on a single set of given input parameters (e.g., the vehicle and environmental parameters). The simulation is iteratively performed until the results of the simulation are within a desired threshold of an optimal solution or when an iteration or series of iterations achieve only small incremental improvements. For example, the simulation is optimized to determine a merge distance and/or merge notification distance that produces a high average speed and short travel time for all vehicles traveling through the merge aperture. Thus, optimizing the merge distance for the vehicles in the simulation may increase the average vehicle speed and vehicle throughput for the merge aperture (e.g., number of vehicles traveling through the merge aperture over a given time). Alternatively, the simulation may be optimized to determine the merge distance that produces the highest average speed and lowest travel time for the merging vehicle.

For example, the simulation may be optimized using particle swarm optimization (PSO). Particle swarm optimization is a computational method that optimizes a problem (e.g., a traffic simulation, traffic function or other equation) by iteratively improving a candidate solution with regard to a given measure of quality (e.g., the minimum distance from a merge aperture that yields the highest average speed of all vehicles involved). Particle swarm optimization is used because PSO does not get stuck in any local maxima. Particle swarm optimization iteratively tests different driving patterns of all vehicles involved through the merge aperture. The driving patterns are tested by varying the parameters of each vehicle according to a set criteria over the environment. Particle swarm optimization then yields an optimal merge distance based on the vehicle and environmental parameters.

Figure 4:
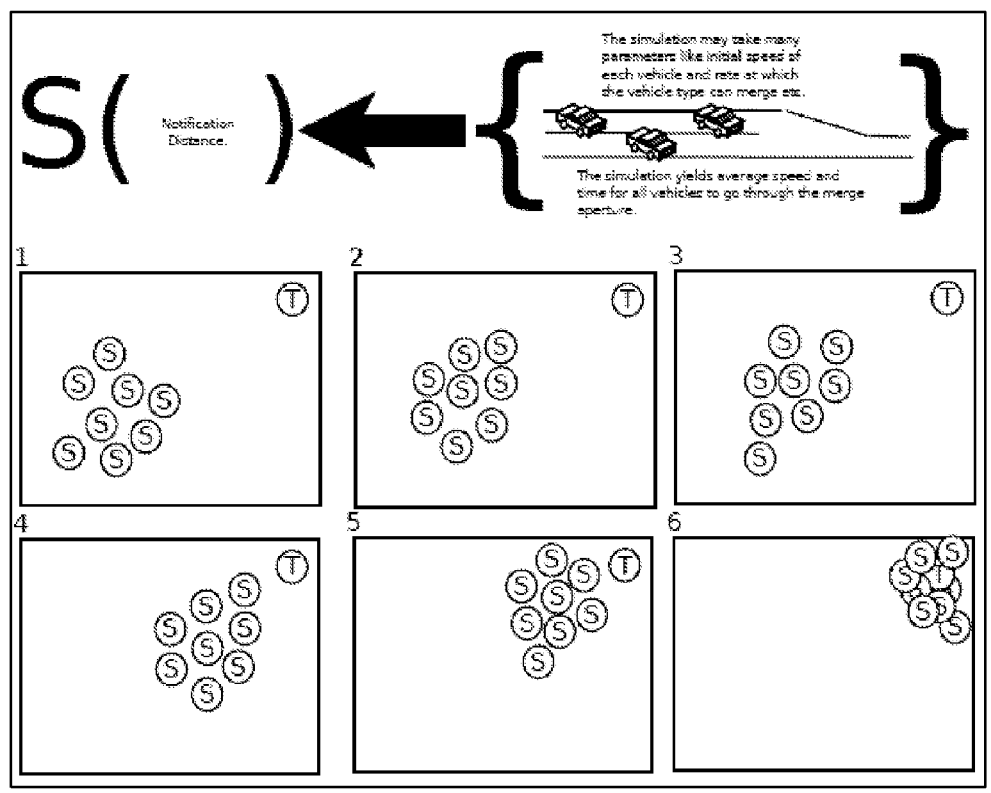
FIG. 4 illustrates an example of particle swarm optimization according to an embodiment.

FIG. 4 illustrates an example of particle swarm optimization. A simulation S is provided. Simulation S can be any function that represents or simulates traffic. Preferably, the simulation S is uses real vehicle parameters, such as the initial speed of each vehicle and the rate at which the vehicle type can merge. The simulation yields the average speed and travel time for all vehicles through the merge aperture, based on a merge notification distance.

As illustrated in FIG. 4, each instance of simulation S is represented by a particle S. In particle swarm optimization terminology, each particle S has a best known position for the instance. The simulation is performed many times to generate a large number of particles S. In each iteration (boxes 1-6), the particle swarm optimization yields a new collection of particles (e.g., one particle from each instance of simulation S). The particle swarm optimization keeps track of the outcomes for the simulation (e.g., the highest average speed and minimal time through the merge aperture). In each subsequent iteration, the particles S move toward an optimal solution T (e.g., the highest possible average speed of the vehicles through the aperture with the minimal travel time for the vehicles aperture). The particle swarm optimization is performed until a predefined threshold of an optimal solution is met or a point of diminishing returns is reached. For example, if the optimal solution T is reached (e.g., one of the particles S has yields a solution that is equal to or nearly equal to the optimal solution T), then the particle swarm optimization is finished. Alternatively, if the particles S are no longer moving toward the optimal solution T, the particle swarm optimization is finished.

As depicted in FIG. 4, the particles S substantially reach the optimal solution T in box 6. Thus, particle swarm optimization stores the notification distance that was used to reach the optimal solution T (e.g., the best notification distance is found and stored). Therefore, the best notification distance is found by performing multiple iterations of the simulation S and storing the notification distance when the optimal solution T is reached. The best notification distance results from randomly varying the inputs to the simulation S and keeping track of the outputs until best known position of the simulation S reaches the optimal solution T.

In particle swarm terminology, the optional solution T is the theoretical optimal solution or greatest best known position possible for the simulation S. In the example of a traffic simulation, the optimal solution may be the highest average speed possible for the environment (e.g., the speed limit for the roadway). By using particle swarm optimization, a particle S cannot get stuck in any local maxima. Instead, if a particle S that gets off track by moving away from the optimal solution T, the particle swarm optimization will recognize that the other particles S are closer to the optimal solution T and will modify the input parameters to enable the particle move toward the optimal solution T.

Figure 9:
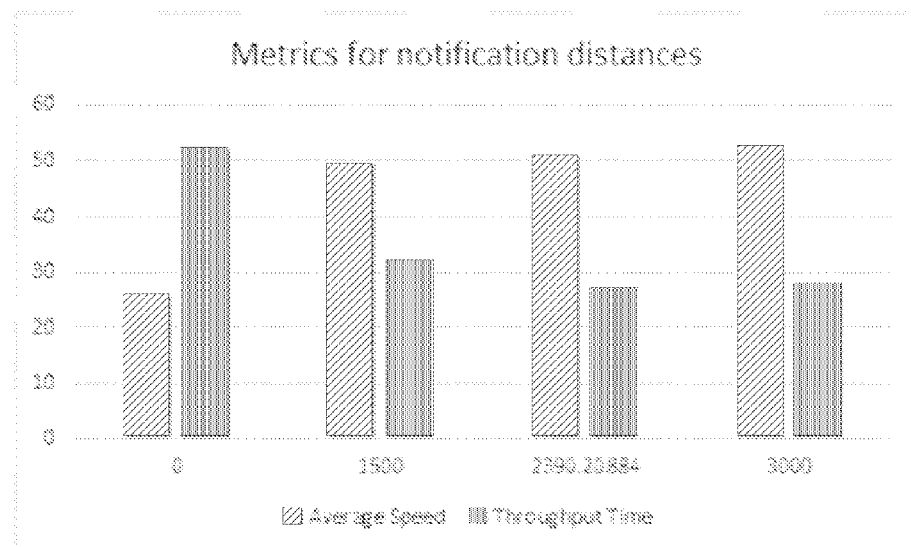
FIG. 9 illustrates an example of results of a particle swarm optimization.

As discussed above, individual iterations, or runs, of the traffic simulation are performed as part of the particle swarm optimization. The particle swarm optimization calculates the optimal merge distance given the large number of simulations ran with a single set vehicle parameters. The particle swarm optimization determines a notification distance for the optimal merge distance that resulted in the highest average speed for all vehicles involved. Better results are returned if the simulation utilizes real vehicle and environmental parameters. In one example, the results of a particle swarm optimization are provided in FIG. 9, tables 1 and 2.

As depicted in tables 1 and 2, the average speed of all vehicles through the merge aperture may increase as the notification distance increases. The throughput time for all vehicles traveling through the merge aperture may also decrease as the merge notification distance increases. The optimal notification distance may be found when the average speed no longer increases and/or the throughput no longer decreases. In the example above, the average speed increases and the throughput decreases up to a merge notification distance of approximately 2390 meters and the throughput time begins to increase as the merge notification distance exceeds approximately 2390 meters. Therefore, in this example, the particle swarm optimization found that approximately 2390 meters is the optimal notification distance.

Figure 5:
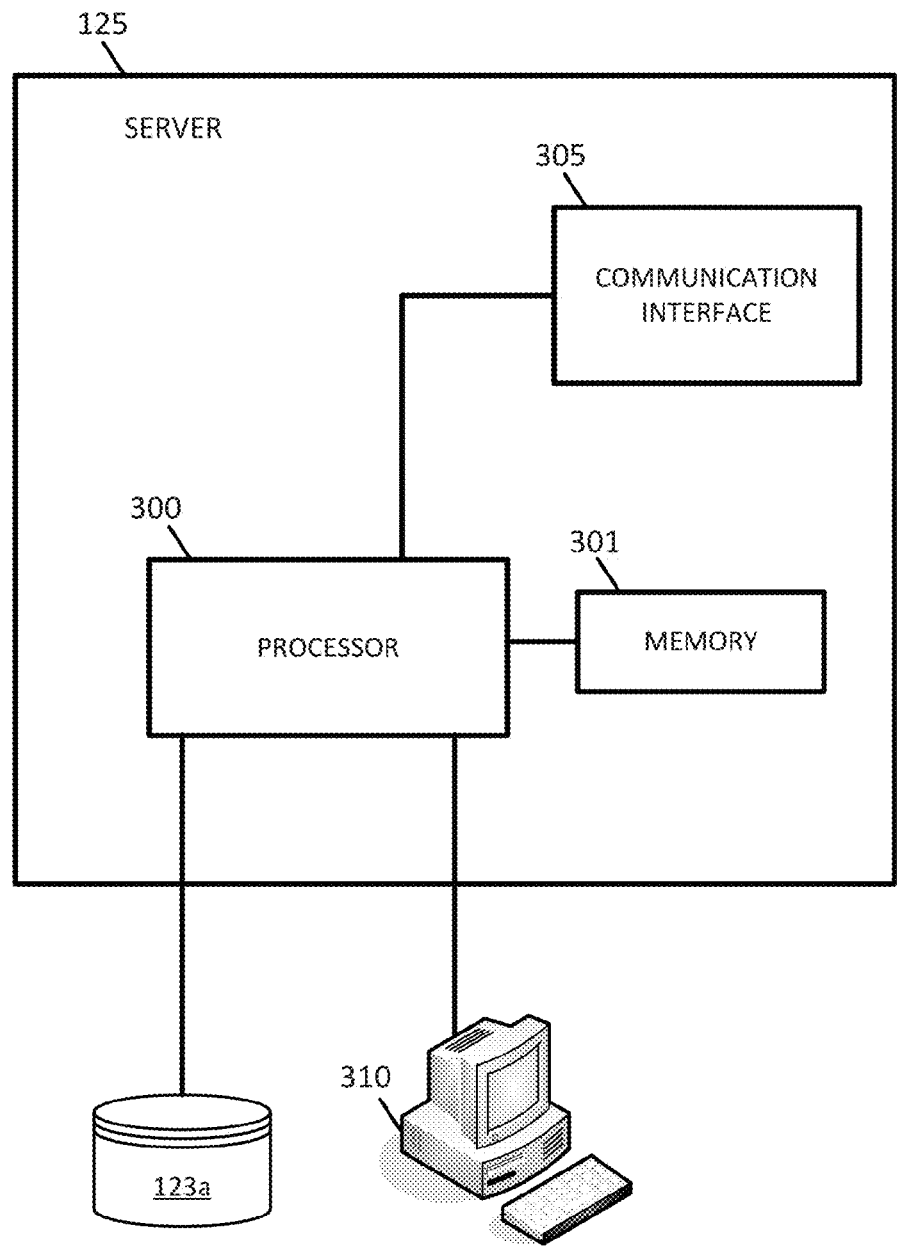
FIG. 5 illustrates an example server device according to an embodiment.

FIG. 5 illustrates an example server device according to an embodiment. The server 125 includes a processor 300, a communication interface 305, and a memory 301. Additional, different, or fewer components may be provided. The processor 300 may be any processor suitable for the execution of a computer program include, by way of example, both general and special purpose microprocessors, and one or more processors of any kind of digital computer. Generally, a processor receives instructions and data from a read only memory, a random access memory or both. The server 125 may be coupled to a database 123a and a workstation 310. Additional, different, or fewer components may be provided. The workstation 310 may be used by a user to access the server 125. The database 123a may store map or other geographic data, and information collected by mobile devices 122 (e.g., vehicle and environmental parameters).

Figure 6:
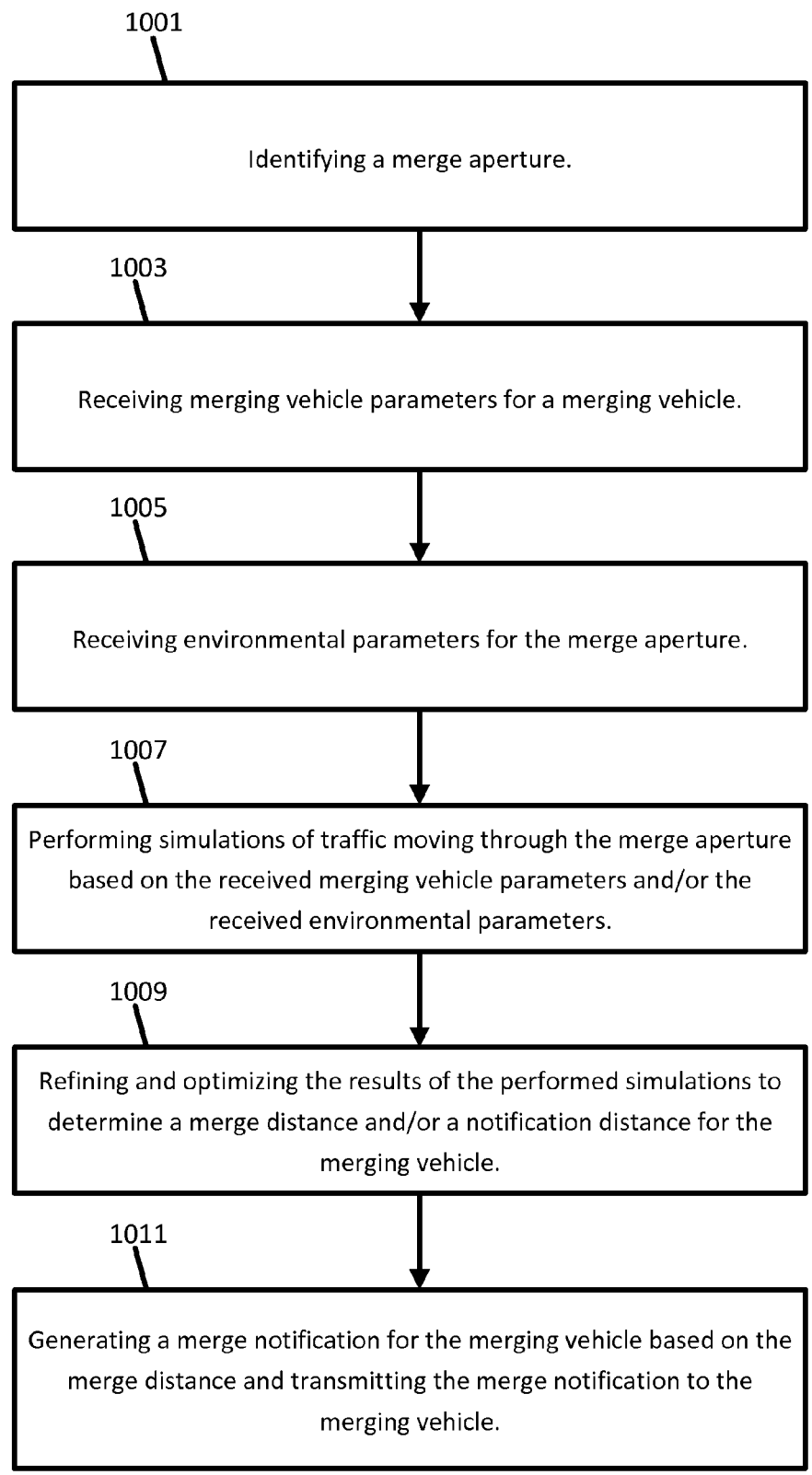
FIG. 6 illustrates an example flowchart for the server device of FIG. 5 according to an embodiment.

FIG. 6 illustrates an example flowchart for the server device of FIG. 5 according to an embodiment. Additional, different or fewer acts may be provided. The method is provided in the order shown. Other orders may be provided and steps may be repeated.

At act 1001, the server 125 identifies a merge aperture. In one embodiment, the server 125 identifies the merge aperture from the map data stored in database 123a. Alternatively, the server 125 identifies the merge aperture from information received from mobile devices 122. Alternatively, the merge aperture is identified from information received from another location. For example, the merge aperture may be identified based on information provided by a third party provider of map information.

At act 1003, the server 125 receives merging vehicle parameters for a merging vehicle. For example, a navigation system 122 in the merging vehicle transmits merging vehicle parameters to the server 125, such as the current speed of the merging vehicle, the current geographic position of the merging vehicle, the vehicle type and characteristics of the merging vehicle, the merging agility of the merging vehicle, etc. Additional, fewer or different merging vehicle parameters may be received by the server 125.

At act 1005, the server 125 receives environmental parameters for the merge aperture. For example, the environmental parameters include vehicle parameters for other vehicles approaching the merge aperture and road conditions for the merge aperture. The vehicle parameters for other vehicles approaching the merge aperture may include the current speed of the other vehicles, the current geographic position of the other vehicles, the vehicle type and characteristics of the other vehicles, the merging agility of the other vehicles, etc. The road conditions may include speed limits, construction information, current weather conditions, etc. Additional, different or fewer environmental parameters may be received by the server 125. The environmental parameters are transmitted to the server 125 by navigation systems 122 in other vehicles and/or by other third party sources of information.

At act 1007, the server 125 performs simulations of traffic moving through the merge aperture based on the received merging vehicle parameters and/or the received environmental parameters. For example, the simulations are a function that simulates traffic using current parameters from real vehicles approaching and traveling through the merge aperture, and current real road conditions surrounding the merge aperture. The simulations yield an average speed and throughput time for all vehicles traveling through the merge aperture based on a merge distance of a merging vehicle and/or a notification distance for the merging vehicle. Alternatively or additionally, the simulations may yield an average speed of the merging vehicle and the throughput time for the merging vehicle traveling through the merge aperture.

At act 1009, the server 125 optimizes the simulations to determine a merge distance and/or a notification distance for the merging vehicle. For example, the simulations are optimized iteratively, by modifying and re-performing the simulations based on the received merging vehicle parameters and environmental parameters. The simulations are iteratively performed and optimized until the results of the simulations are within a desired threshold of an optimal solution or when an iteration or series of iterations achieve only small incremental improvements. In one embodiment, the simulations are optimized using particle swarm optimization. Different optimization algorithms or schemas may be used.

At act 1011, the server 125 generates a merge notification for the merging vehicle based on the merge distance and/or the merge notification distance. The merge notification may be a warning, a driver instruction, etc. The server transmits the merge notification to the navigation system 122 in the merging vehicle.

Figure 7:
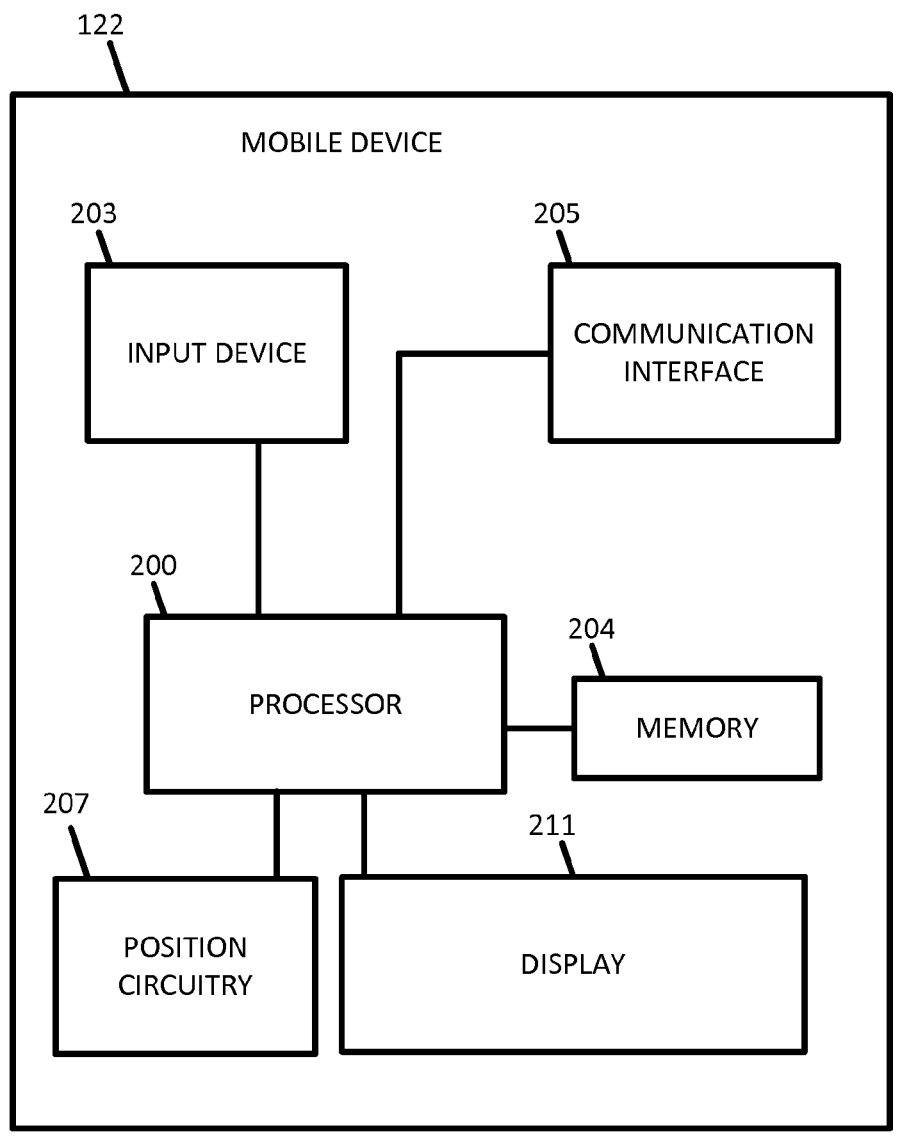
FIG. 7 illustrates an example mobile device according to an embodiment.

FIG. 7 illustrates an example mobile device according to an embodiment. The mobile device 122 includes a processor 200, a memory 204, an input device 203, a communication interface 205, position circuitry 207, and a display 211. Additional, different, or fewer components are possible for the mobile device 122.

The processor 200 may be any processor suitable for the execution of a computer program include, by way of example, both general and special purpose microprocessors, and anyone or more processors of any kind of digital computer. Generally, a processor receives instructions and data from a read only memory, a random access memory or both.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 200 may include a general processor, digital signal processor, an application specific integrated circuit (ASIC), field programmable gate array (FPGA), analog circuit, digital circuit, combinations thereof, or other now known or later developed processor. The controller 200 and/or processor 200 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the merge notification.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the merge notification.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue controls for these feature in response to merge notification.

Driving assistance may be provided based on the merge notification and an array of sensors that may include any combination of a brake sensor, a steering sensor, an environment sensor, a vehicle sensor, an optical sensor, and an inertial sensor. Additional, different, or fewer sensors may be used.

The brake sensor may be a brake pedal sensor that detects displacement of the brake pedal of the vehicle. The brake sensor may detect the actuation of the brake pads near the wheel of the vehicle. The brake sensor may be a circuit that detects operation of the brakes through an anti-lock brake system. The steering sensor may be a steering wheel sensor that detects movement of the steering wheel of the vehicle. The steering sensor may detect the angle of the steering wheel. The steering sensor may detect the angle of the front wheel of the vehicle. The environment sensor may detect the environment of the vehicle. The environment sensor may include a weather sensor such as a thermometer, barometer, or a rain sensor. The rain sensor may detect the movement of windshield wipers. The vehicle sensor may detect an operation of the vehicle. The vehicle sensor may include a throttle sensor that measures a position of a throttle of the engine or a position of an accelerator pedal, a speedometer sensor, or a tachometer sensor. The vehicle sensor may detect a malfunction of the vehicle. For example, the vehicle sensor may be a tire pressure sensor. The optical sensor may include a camera, a LiDAR device, a proximity sensor, or another sensor configured to detect distances to nearby objects or when a nearby object exists. The optical sensor may send a signal that reflects off another object and is detected by the optical sensor. The inertial sensor may include an inertial measurement unit (IMU) including one or more of an accelerometer, a gyroscope, and a magnetic sensor. The inertial sensor may generate data indicative of the acceleration, deceleration, rotational acceleration, and rotation deceleration experienced by the vehicle.

Figure 8:
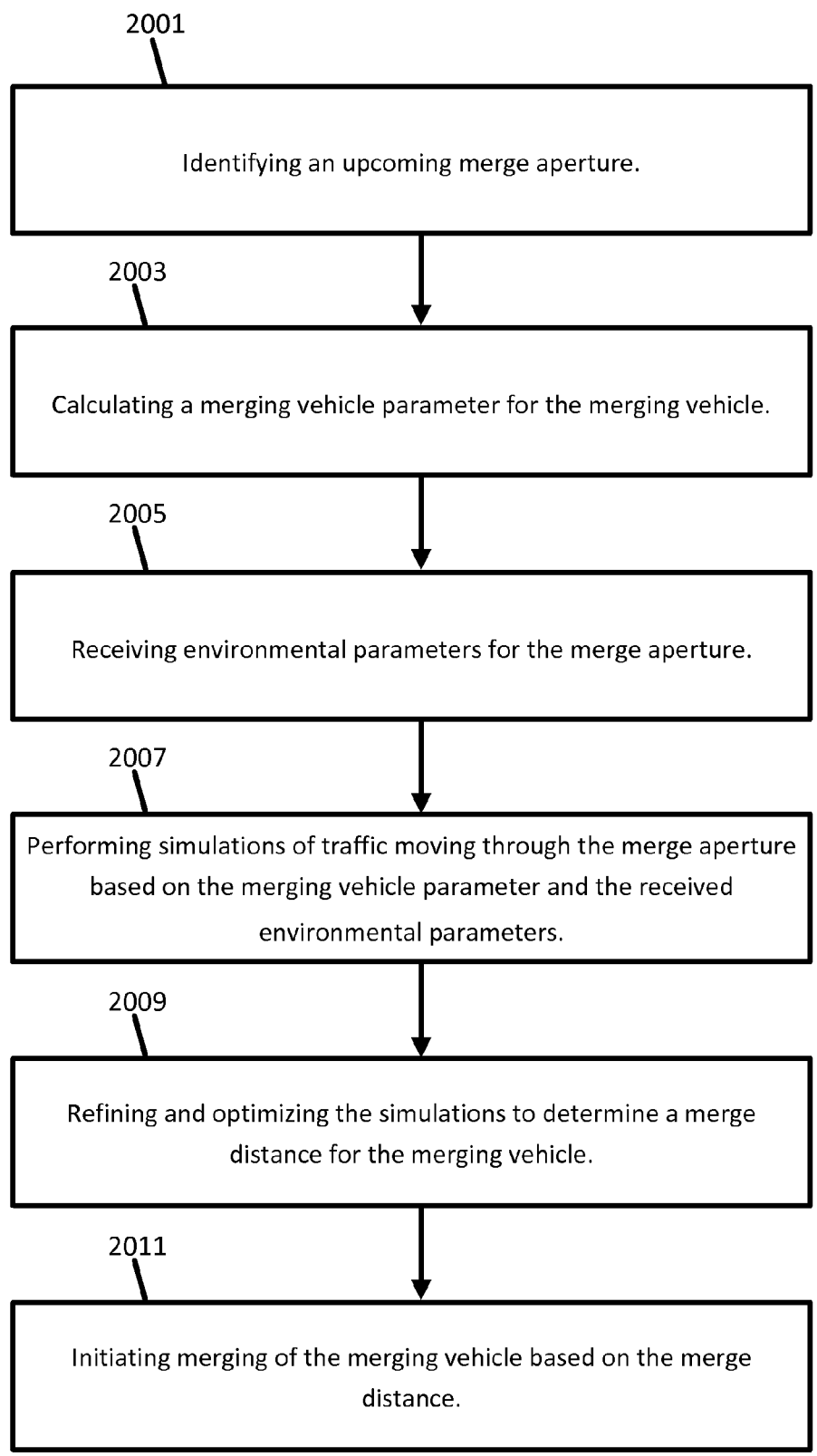
FIG. 8 illustrates an example flowchart for the mobile device of FIG. 7 according to an embodiment.

FIG. 8 illustrates an example flowchart for the mobile device of FIG. 7 according to an embodiment. Additional, different or fewer acts may be provided. The method is provided in the order shown. Other orders may be provided and steps may be repeated.

At act 2001, the mobile device 122 identifies an upcoming merge aperture. In one embodiment, the mobile device 122 identifies the merge aperture from the map data stored in database 123b. Alternatively, the mobile device 122 identifies the merge aperture from the information captured by the mobile device 122. Alternatively, the merge aperture is identified from information received from a third party provider of map information (e.g., via communication interface 205).

At act 2003, the mobile device 122 calculates a merging vehicle parameter for the merging vehicle. For example, the mobile device 122 in the merging vehicle calculates one or more vehicle parameters, such as the current speed of the merging vehicle, the current geographic position of the merging vehicle, the vehicle type and characteristics of the merging vehicle, the merging agility of the merging vehicle, etc. Additional, fewer or different merging vehicle parameters may be calculated by the mobile device 122.

At act 2005, the mobile device 122 receives environmental parameters for the merge aperture. For example, the environmental parameters include vehicle parameters for other vehicles approaching the merge aperture and road conditions for the merge aperture. The vehicle parameters for other vehicles approaching the merge aperture may include the current speed of the other vehicles, the current geographic position of the other vehicles, the vehicle type and characteristics of the other vehicles, the merging agility of the other vehicles, etc. The road conditions may include speed limits, construction information, current weather conditions, etc. Additional, fewer or different environmental parameters may be received by the mobile device 122. The environmental parameters are received by the mobile device 122 via communication interface 205 from other vehicles and/or from other third party sources of information.

At act 2007, the mobile device 122 performs simulations of traffic moving through the merge aperture based on the merging vehicle parameter and the received environmental parameters. For example, the simulations are a function that simulates traffic using current parameters from real vehicles approaching and traveling through the merge aperture, and current real road conditions surrounding the merge aperture. The simulations yields an average speed and throughput time for all vehicles traveling through the merge aperture based on a merge distance of a merging vehicle and/or a notification distance for the merging vehicle. Alternatively or additionally, the simulation may yield an average speed of the merging vehicle and the throughput time for the merging vehicle traveling through the merge aperture.

At act 2009, the mobile device 122 optimizes the simulations to determine a merge distance for the merging vehicle. For example, the simulations are optimized iteratively, by modifying and re-performing the simulations based on the received merging vehicle parameters and environmental parameters. The simulations are iteratively performed and optimized until the results of the simulations are within a desired threshold of an optimal solution or when an iteration or series of iterations achieve only small incremental improvements. In one embodiment, the simulations are optimized using particle swarm optimization. Different optimization algorithms or schemas may be used.

At act 2011, the mobile device 122 initiates merging of the merging vehicle based on the merge distance. For example, mobile device 122 may initiate merging via a driving assistance system based on the merge distance as an input. The driving assistance system may initiate merging by controlling the merging vehicle in one or more ways, such as: activating the merging vehicle's direction turn signals indicating a lane change; modulating the merging vehicle's throttle to speed up or slow down; modulating the merging vehicle's brakes to speed up or slow down; and/or adjusting the merging vehicle's steering. Additional or different vehicle control may be used. For example, a merge notification may be provided to the driver.

Referring back to FIG. 1, map databases, such as geographic databases 123a and 123b, are used in computer-based systems that provide useful features to users. For example, map databases are used for the identification of routes to destinations or points of interests. A navigation system determines the optimum route to be taken by the end user to travel from the origin to the destination location from map data stored in a geographic (or map) database. Map databases are also used in advanced driver assistance systems, such as curve warning systems, adaptive cruise control systems and headlight aiming systems. Map databases are also used in systems that improve vehicle fuel economy, such as systems that optimize transmission gear selection taking into account upcoming slope and speed changes.

As shown in FIG. 1, a master copy of the geographic database 123a may be stored at the server 125, and a local copy of the geographic database 123b may be stored at the mobile device 122. In one example, the local copy of the database 123b is a full copy of the geographic database, and in another example, the local copy of the database 123b may be a cached or partial portion of the geographic database. The cached portion may be defined based on a geographic location of the mobile device 122 or a user selection made at the mobile device 122. The geographic databases 123a and 123b may be a geographic database including road links or segments. Additional, different, or fewer components may be provided.

The geographic databases 123a and 123b may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

Each road segment may be associated with two nodes (e.g., one node represents the point at one end of the road segment and the other node represents the point at the other end of the road segment). The node at either end of a road segment may correspond to a location at which the road meets another road, i.e., an intersection, or where the road dead-ends. Each road segment may be associated with zero or more shape points. Shape points are an ordered sequence of vertices that indicate the shape of the road as a polyline between the nodes. The road shape may also be represented by an analytical curve such as a B-spline, Bezier curve, Clothoid curve or other curve types. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data may include a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the mobile device 122, or at an external location.

The server 125 may send map updates to the mobile device 122. The server 125 may update a particular tile of the geographic database 123. The server 125 may send updates to the master copy of the geographic database 123a and/or send updates to the local copy of the geographic database 123b. The server 125 may generate an update script or patch file for the navigation data and transmit the update script or patch file to the mobile device 122 to update the local copy of the database 123b.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The mobile device 122 may be configured to execute routing algorithms to determine an optimum route to travel along a road network from an origin location to a destination location in a geographic region. Using input from the end user, the mobile device 122 examines potential routes between the origin location and the destination location to determine the optimum route. The mobile device 122 may then provide the end user with information about the optimum route in the form of guidance that identifies the maneuvers required to be taken by the end user to travel from the origin to the destination location. Some mobile devices show detailed maps on displays outlining the route, the types of maneuvers to be taken at various locations along the route, locations of certain types of features, and so on.

The computing resources may be divided between the server 125 and the mobile device 122. In some embodiments, the server 125 performs a majority of the processing. In other embodiments, the mobile device 122 performs a majority of the processing. In addition, the processing may be divided substantially evenly between the server 125 and the mobile device 122.

The map developer system in server 125 and the mobile device 122 are coupled with the network 127. The phrase "coupled with" is defined to mean directly connected to or indirectly connected through one or more intermediate components. Such intermediate components may include hardware and/or software-based components. Many mobile devices 122 may connect with the network 127.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, or projector, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   identifying, using a processor, a merge aperture;
   receiving, over a network, merging vehicle parameters for a merging vehicle approaching the merge aperture;
   performing, using the processor, a plurality of simulations of traffic moving through the merge aperture based on the received merging vehicle parameters, the plurality of simulations yielding an average speed and a travel time for vehicles traveling through the merge aperture based on varying simulated driving patterns of the vehicles;
   optimizing, using the processor, a merge distance for the merging vehicle based on the plurality of simulations; and
   generating, using the processor, a merge notification for the merging vehicle based on the merge distance.

2. The method of claim 1, wherein receiving the merging vehicle parameters comprises:
   receiving an initial vehicle speed of the merging vehicle and a merging rate.

3. The method of claim 1 further comprising:
   receiving, over the network, environmental parameters for the merge aperture.

4. The method of claim 3, wherein the simulations of traffic moving through the merge aperture are also based on the environmental parameters.

5. The method of claim 4, wherein the environmental parameters include road conditions and speeds of other vehicles approaching the merge aperture.

6. The method of claim 1, wherein the simulations are optimized by iteratively modifying the simulations.

7. The method of claim 6, wherein the simulations are optimized using a particle swarm optimization.

8. The method of claim 1, wherein the merge distance minimizes a travel time of the merging vehicle through the aperture.

9. The method of claim 1, wherein the merge distance maximizes an average speed of the merging vehicle through the aperture.

10. The method of claim 1, wherein the merge distance minimizes a travel time for all vehicles traveling through the aperture.

11. The method of claim 1, wherein the merge distance maximizes the average speed of all vehicles traveling through the aperture.

12. The method of claim 1, wherein the merge notification includes a notification distance from the merge aperture based on the merge distance.

13. The method of claim 12, wherein the notification distance is based on a merging rate of an autonomous driving system of the merging vehicle.

14. The method of claim 12, wherein the notification distance is based on a merging rate of the merging vehicle and an estimated reaction time of a driver operating the merging vehicle to the merge notification.

15. The method of claim 1, further comprising:
transmitting the merge notification to the merging vehicle.

16. The method of claim 15, wherein the merge notification is transmitted to a navigation system in the merging vehicle.

17. An apparatus for organized intelligent merge notifications, the apparatus comprising:
at least one processor; and
at least one memory including computer program code for one or more programs;
the at least one memory and the computer program code configured to, with the at least one processor, cause the apparatus to at least perform:
identifying an upcoming merge aperture;
calculating a merging vehicle parameter for a vehicle approaching the merge aperture;
receiving, over a network, environmental parameters for the merge aperture;
performing simulations of traffic moving through the merge aperture based on the merging vehicle parameter and the received environmental parameters;
optimizing the simulations to determine a merge distance for the merging vehicle; and
generating a merge notification for the merging vehicle based on the merge distance.

18. The apparatus of claim 17, wherein the merging vehicle parameter comprises the initial vehicle speed of the merging vehicle.

19. The apparatus of claim 17, wherein the environmental parameters comprise road conditions of the merge aperture and speeds of other vehicles approaching the merge aperture.

20. The apparatus of claim 17, wherein the simulations are optimized using a particle swarm optimization.

21. The apparatus of claim 20, wherein the merge distance minimizes the travel time of the merging vehicle through the merge aperture and maximizes the average speed of the merging vehicle through the merge aperture.

22. The apparatus of claim 20, wherein optimizing the simulations comprises minimizing the travel time for all vehicles traveling through the aperture and maximizing the average speed of all vehicles traveling through the aperture.

23. A non-transitory computer readable medium including instructions that when executed are operable to:
identify a merge aperture;
calculate merging vehicle parameters for a vehicle approaching the merge aperture;
calculate environmental parameters for the merge aperture;
simulate traffic moving through the merge aperture based on the merging vehicle parameters and the received environmental parameters;
optimize the simulation to determine a merge distance for the merging vehicle, wherein the merge distance minimizes travel time of the merging vehicle through the aperture; and
initiate merging of the merging vehicle based on the merge distance.

24. The non-transitory computer readable medium of claim 23, wherein initiating merging comprises:
activating the merging vehicle's turn signal.

25. The non-transitory computer readable medium of claim 23, wherein initiating merging comprises:
modulating the speed of the merging vehicle.

26. The non-transitory computer readable medium of claim 23, wherein initiating merging further comprises:
steering the merging vehicle into a different lane of traffic.

* * * * *